(12) United States Patent
Foley

(10) Patent No.: US 9,707,892 B2
(45) Date of Patent: *Jul. 18, 2017

(54) MULTI-FOCUS OPTICAL SYSTEM

(71) Applicant: Gentex Corporation, Zeeland, MI (US)

(72) Inventor: Andrew M. Foley, West Olive, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,956

(22) Filed: Jul. 8, 2014

(65) Prior Publication Data

US 2014/0320656 A1    Oct. 30, 2014

Related U.S. Application Data

(63) Continuation-in-part of application No. 13/869,277, filed on Apr. 24, 2013, now Pat. No. 9,550,455.

(60) Provisional application No. 61/638,013, filed on Apr. 25, 2012.

(51) Int. Cl.
| | |
|---|---|
| *H04N 7/18* | (2006.01) |
| *B60R 1/00* | (2006.01) |
| *G06T 15/00* | (2011.01) |
| *B60R 11/00* | (2006.01) |
| *G06K 9/00* | (2006.01) |
| *G02B 27/22* | (2006.01) |
| *H04N 5/232* | (2006.01) |

(52) U.S. Cl.
CPC .............. *B60R 1/002* (2013.01); *B60R 11/00* (2013.01); *G02B 27/225* (2013.01); *G02B 27/2214* (2013.01); *G06K 9/00791* (2013.01); *G06T 15/005* (2013.01); *H04N 5/23212* (2013.01)

(58) Field of Classification Search
CPC .. G05D 1/0038; H04N 7/185; H04N 5/23212; B60R 1/002; B60R 11/00; G02B 27/2214; G02B 27/225; G06K 9/00791; G06T 15/005
USPC ........................................................ 348/114
See application file for complete search history.

(56) References Cited

U.S. PATENT DOCUMENTS

| | | |
|---|---|---|
| 5,148,209 A | 9/1992 | Subbarao |
| 5,193,124 A | 3/1993 | Subbarao |
| 6,362,773 B1 | 3/2002 | Pochmuller |
| 7,151,996 B2 | 12/2006 | Stein |
| 7,243,945 B2 | 7/2007 | Breed et al. |
| 7,440,634 B2 | 10/2008 | Ben-Ezra et al. |
| 7,620,202 B2 | 11/2009 | Fujimura et al. |
| 7,684,590 B2 | 3/2010 | Kampchen et al. |
| 7,723,662 B2 | 5/2010 | Levoy et al. |
| 7,792,423 B2 | 9/2010 | Raskar et al. |

(Continued)

OTHER PUBLICATIONS

Andras Bodis-Szomoru, Tamas Daboczi, Zoltan Fazekas, A Far-Range Off-line Camera Calibration Method for Stereo Lane Detection Systems, Instrumentation and Measurement Technology Conference—IMTC 2007, Warsaw, Poland, May 1-3, 2007, 6 pages.

*Primary Examiner* — Michael Lee
(74) *Attorney, Agent, or Firm* — Price Heneveld LLP; Bradley D. Johnson

(57) ABSTRACT

An imager system and a display system for a vehicle are provided. The imager system includes at least one imager configured to capture a multi-focus image having depth data. The display system includes at least one display assembly configured to display a multi-focus image having depth data.

12 Claims, 16 Drawing Sheets

(56) References Cited

U.S. PATENT DOCUMENTS

| | | |
|---|---|---|
| 7,936,392 B2 | 5/2011 | Ng et al. |
| 7,962,033 B2 | 6/2011 | Georgiev et al. |
| 7,965,936 B2 | 6/2011 | Raskar et al. |
| 8,160,439 B2 | 4/2012 | Georgiev et al. |
| 8,248,515 B2 | 8/2012 | Ng et al. |
| 8,289,440 B2 | 10/2012 | Knight et al. |
| 2007/0154068 A1 | 7/2007 | Stein et al. |
| 2008/0266655 A1* | 10/2008 | Levoy ............... G02B 21/361 359/368 |
| 2008/0297374 A1* | 12/2008 | Usami ................. B60Q 1/143 340/935 |
| 2010/0277935 A1 | 11/2010 | Endo et al. |
| 2011/0234841 A1 | 9/2011 | Akeley et al. |
| 2012/0050562 A1 | 3/2012 | Perwass et al. |
| 2012/0176506 A1* | 7/2012 | Tajiri ................... H04N 5/2254 348/222.1 |
| 2014/0168415 A1* | 6/2014 | Ihlenburg et al. ............ 348/118 |

\* cited by examiner

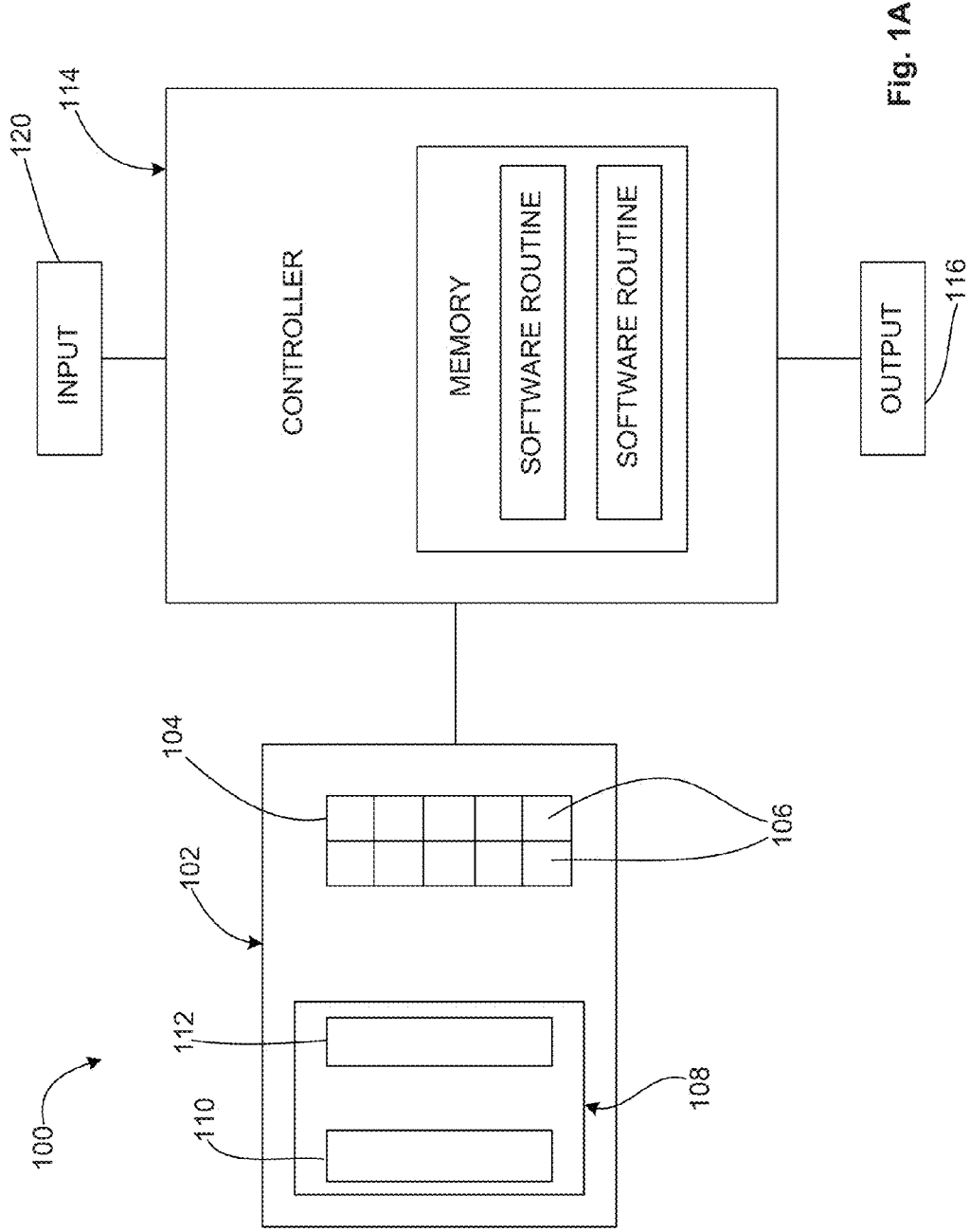

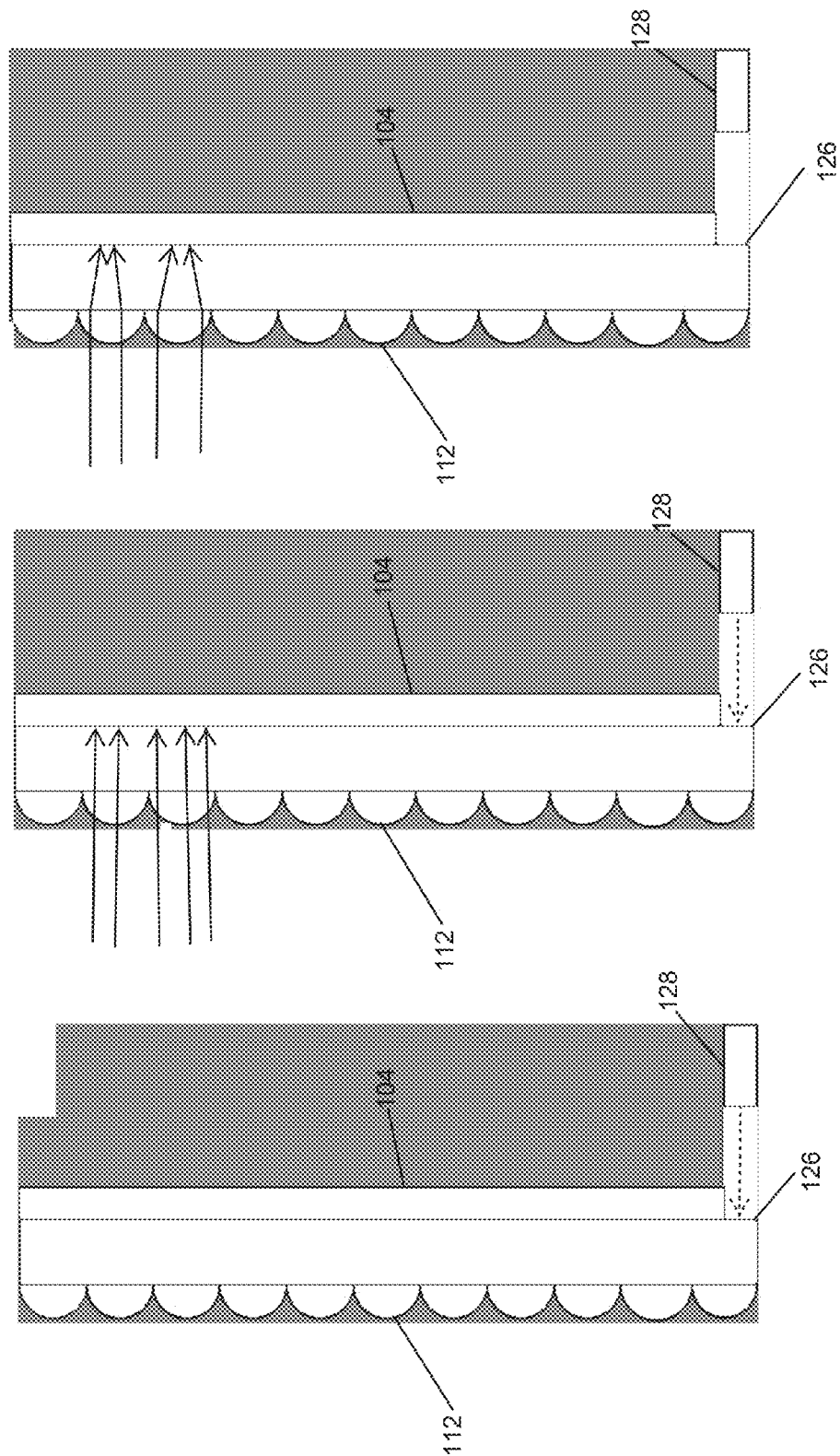

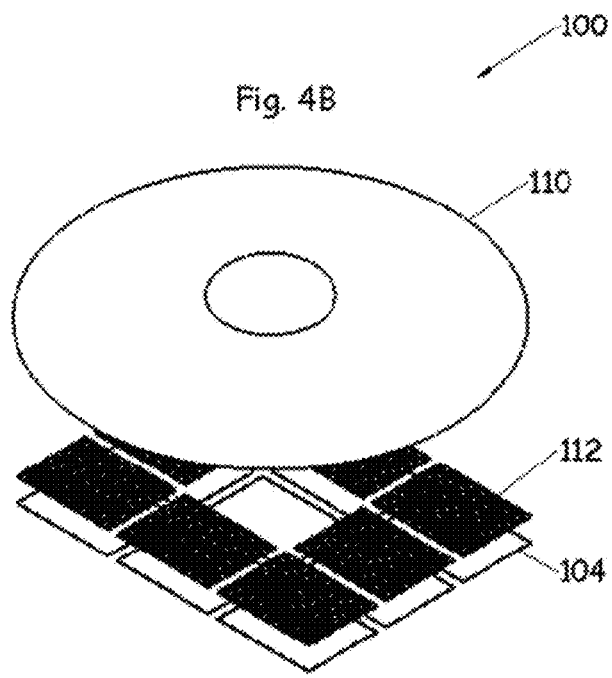
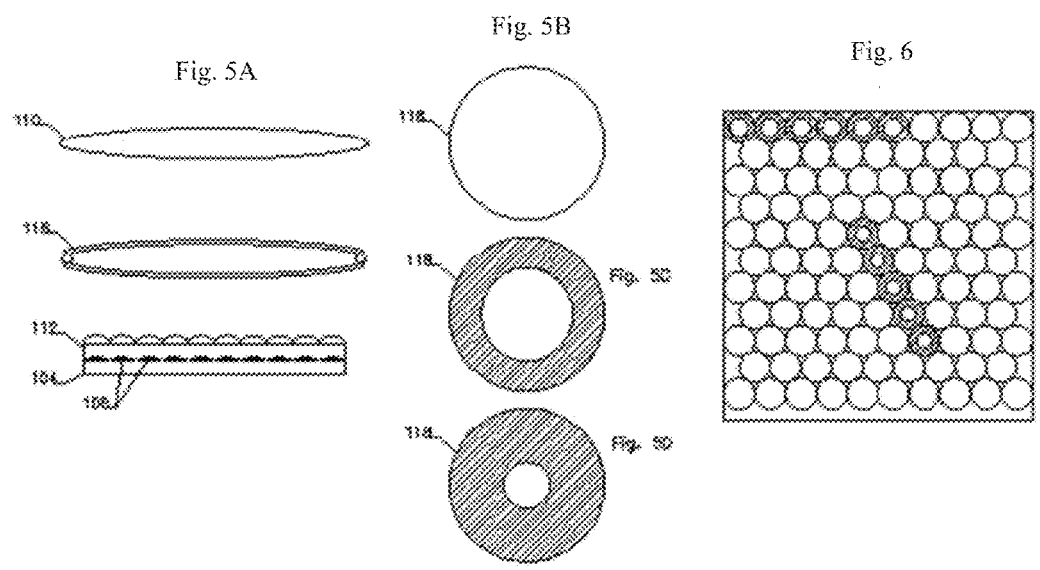

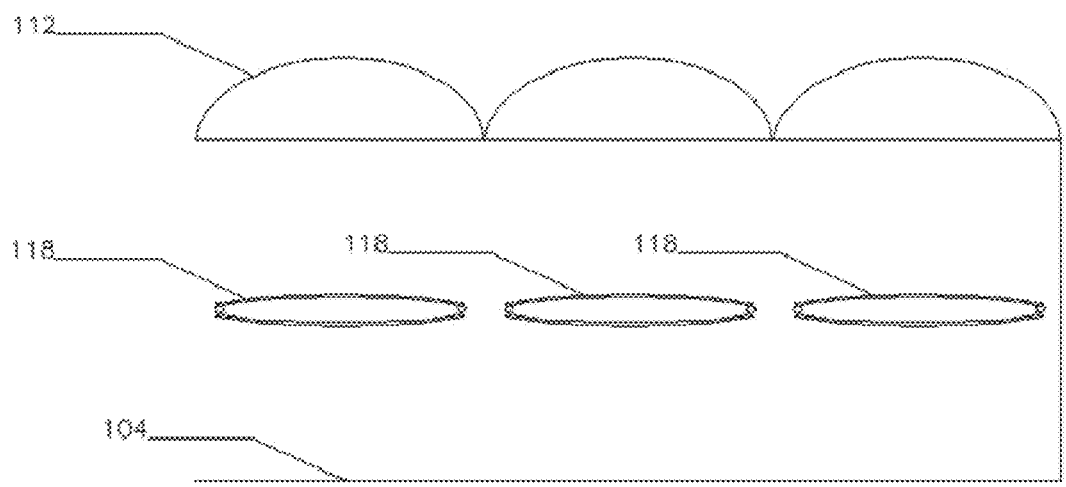
Fig. 7
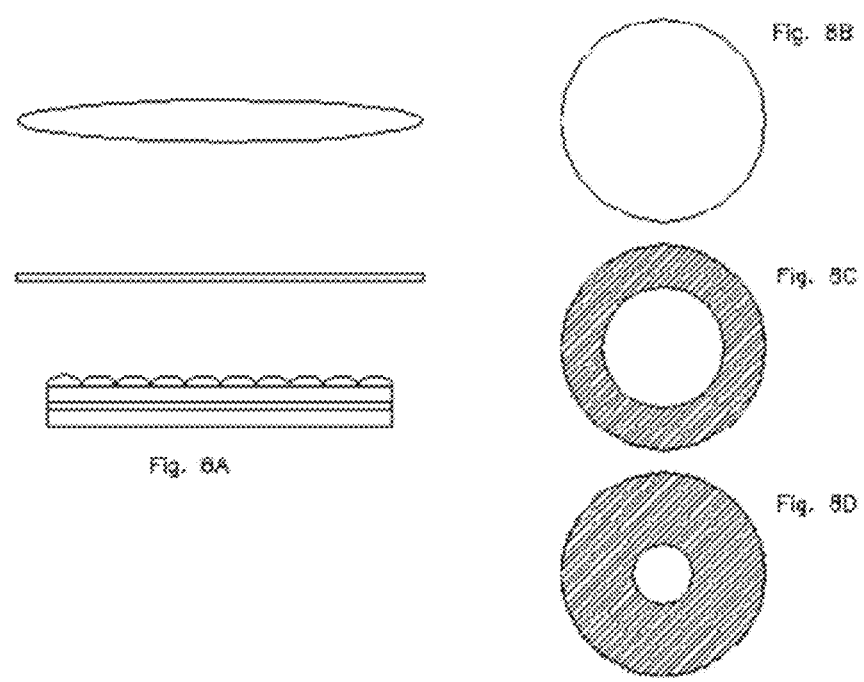

MULTI-FOCUS OPTICAL SYSTEM

CROSS-REFERENCE TO RELATED APPLICATION

This application is a Continuation-In-Part of U.S. patent application Ser. No. 13/869,277, filed Apr. 24, 2013, and entitled "MULTI-FOCUS OPTICAL SYSTEM," now U.S. Pat. No. 9,550,455, which claims the benefit of U.S. Provisional Patent Application No. 61/638,013, filed on Apr. 25, 2012, entitled "MULTI-FOCUS OPTICAL SYSTEM," the entire disclosures of which are incorporated herein by reference.

FIELD OF THE INVENTION

The present invention generally relates to a multi-focus optical system, and more particularly, a multi-focus optical system including an imager or a display with multi-focus optics.

BACKGROUND OF THE INVENTION

Generally, vehicles can have imager systems for capturing images that can be displayed on a display system.

SUMMARY OF THE INVENTION

According to one aspect of the present invention, an imager system is provided. The imager system includes at least one imager configured to capture a multi-focus image having depth data. The at least one imager includes at least one image sensor having an array of pixels. An optics assembly is included having a main lens assembly configured to capture light rays from a scene and substantially focus the light rays on to a plane. The optics assembly also includes at least one micro lens assembly disposed between and in optical communication with the main lens assembly and the at least one image sensor. At least a portion of the light rays outputted from the main lens assembly pass through the at least one micro lens assembly and is received by the at least one image sensor. A controller is in communication with the at least one imager and is configured to output a signal to a vehicle control system, the signal is based upon the depth data of the multi-focus image.

According to another aspect of the present invention, a display system configured for an occupant display system is provided. The display system includes at least one display assembly configured to display a multi-focus image having depth data. The display assembly includes a display having an array of pixels and a light engine for generating an image on the display. An optics assembly is in optical communication with the display and includes a micro lens assembly configured to capture and output light rays from the display. The optics assembly also includes a main lens assembly configured to receive the light rays outputted from the micro lens assembly and to substantially project the light rays on to a plane. A controller is in communication with the display assembly and configured to receive an input from an imager and output a signal for displaying an image having depth data on the display assembly.

According to yet another aspect of the present invention, a glasses-less 3D display system for a vehicle is provided. The display includes a display assembly configured to display an image and comprising a display having a plurality of pixels. A display device is in optical communication with the display assembly and is configured to convey depth perception to a viewer viewing the image. A controller is in communication with the display assembly and is configured to receive an input from an imager and output a signal for displaying the image on the display assembly.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 1A is a block diagram of an imager system, in accordance with one embodiment of the present invention;

FIG. 1D illustrates an interface disposed between a micro lens assembly and an image sensor, according to one embodiment of the present invention;

FIG. 1E illustrates the interface undergoing laser excitation;

FIG. 1F illustrates light incident on the interface undergoing a focusing effect when laser excitation ceases to be applied to the interface;

FIG. 4B is a schematic diagram of an imager system, in accordance with one embodiment of the present invention;

FIG. 5A is a schematic diagram of an imager system, in accordance with one embodiment of the present invention;

FIG. 5B is a schematic diagram of an electro-optic aperture in an approximately fully open state, in accordance with one embodiment of the present invention;

FIG. 5C is a schematic diagram of an electro-optic aperture in an at least partially closed state, in accordance with one embodiment of the present invention;

FIG. 5D is a schematic diagram of an electro-optic aperture in an at least partially closed state, in accordance with one embodiment of the present invention;

FIG. 6 is a schematic diagram of a plurality of electro-optic apertures, in accordance with one embodiment of the present invention;

FIG. 7 is a schematic diagram of an imager system, wherein at least a portion of the micro lenses has a corresponding electro-optic aperture, in accordance with one embodiment of the present invention FIG. 8A is a schematic diagram of an imager system, in accordance with one embodiment of the present invention;

FIG. 8B is a schematic diagram of an electro-optic aperture in an approximately fully open state, in accordance with one embodiment of the present invention;

FIG. 8C is a schematic diagram of an electro-optic aperture in an at least partially closed state, in accordance with one embodiment of the present invention;

FIG. 8D is a schematic diagram of an electro-optic aperture in an at least partially closed state, in accordance with one embodiment of the present invention;

DETAILED DESCRIPTION

Figure 1B:
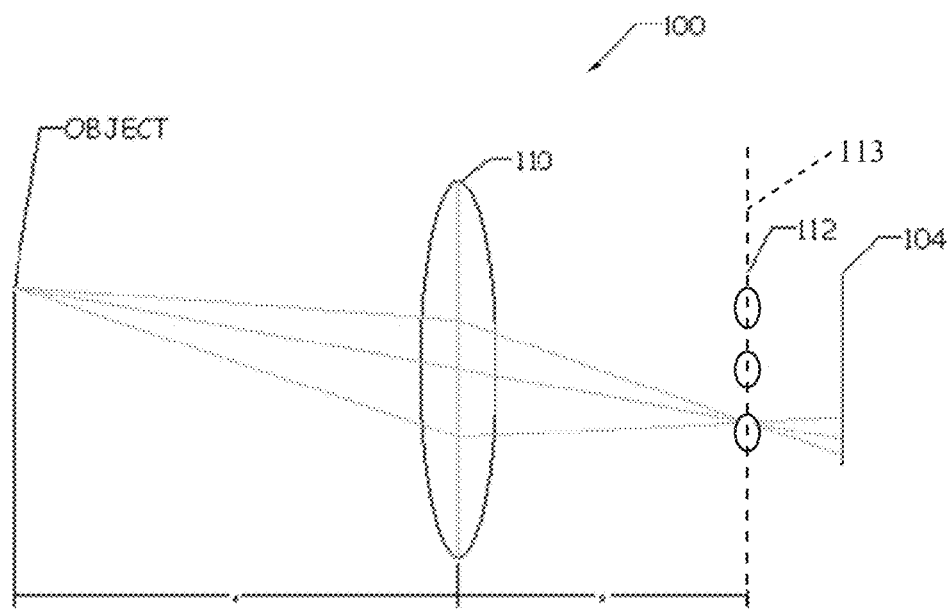
FIG. 1B is a schematic diagram of an imager system, in accordance with one embodiment of the present invention.

The present illustrated embodiments reside primarily in combinations of method steps and apparatus components related to a multi-focus optical system. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1C:
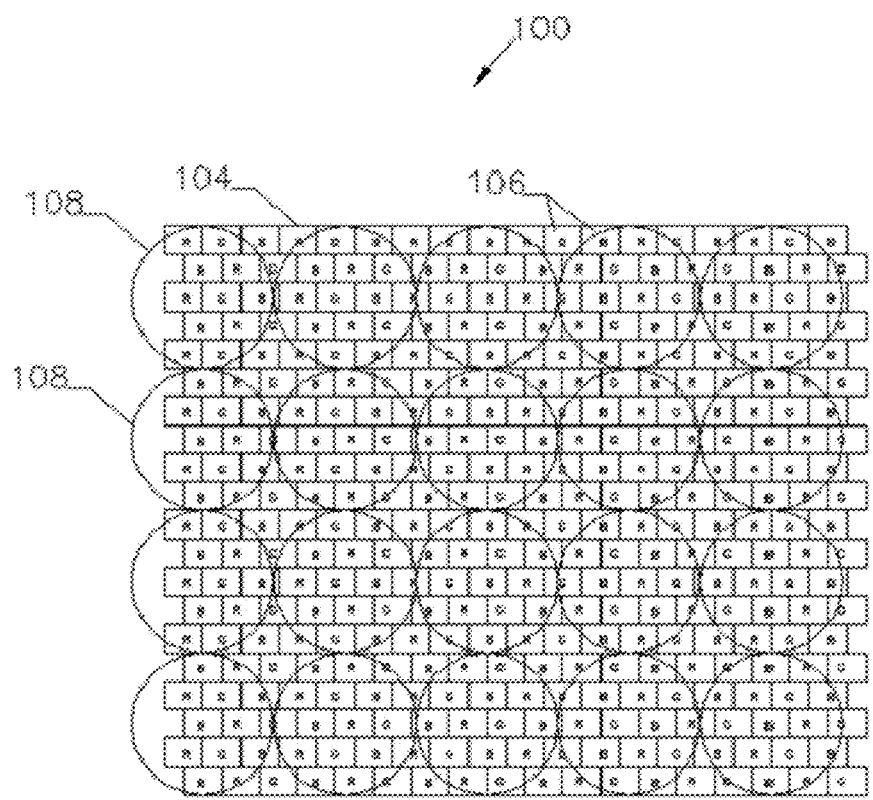
FIG. 1C is a schematic diagram of an imager system, in accordance with one embodiment of the present invention.

In reference to FIGS. 1A-1C, an imager system is generally shown at reference identifier 100. Typically, the imager system 100 can be configured to be used in a vehicle control system. The imager system 100 can include at least one imager generally indicated at reference identifier 102, which can be configured to capture a multi-focus image having depth data, wherein the imager 102 includes an image sensor 104 having an array of pixels 106, and an optics assembly generally indicated at reference identifier 108, which is in optical communication with the image sensor 104. The optics assembly 108 can be configured to capture light rays, and can include a main lens assembly 110 disposed in front of the image sensor 104 and a micro lens assembly 112 that is disposed between the main lens assembly 110 and the image sensor 104.

The main lens assembly 110 can be configured to capture light rays from a scene and focus the light rays on to a plane 113, which is exemplarily shown in FIG. 1B as coinciding with the micro lens assembly 112. However, it should be appreciated that the plane 113 may be located in front of the micro lens assembly 112 or behind the micro lens assembly 112. The micro lens assembly 112 can be disposed relative to the image sensor 104 such that each micro lens of the micro lens assembly 112 is focused out to infinity. Light captured and outputted from the main lens assembly 110 passes through the micro lens assembly 112 and is received by the image sensor 104. For purposes of clarity, light rays are shown in FIG. 1B converging towards a single micro lens of the micro lens assembly 112. The light rays pass through the micro lens and diverge towards the image sensor 104 to generate a micro image of the main lens assembly 110 on the image sensor 104. Thus, with respect to the illustrated embodiment, a plurality of diverging micro images, one for each micro lens of the micro lens assembly 112, may be generated on the image sensor 104. Alternatively, by changing the position of the plane 113 relative to the micro lens assembly 112 (e.g. positioning the plane 113 behind the micro lens assembly 112), it is possible to generate converging micro images on the image sensor 104. That is, light rays passing through each micro lens of the micro lens assembly 112 are made to converge towards the image sensor 104.

The imager system 100 can further include a controller generally indicated at reference identifier 114, which is in communication with the imager 102. The controller 114 can be configured to output a signal 116 to a vehicle system, and the signal 116 is based upon the depth data determined from the multi-focus image, as described in greater detail herein.

Figure 1I:
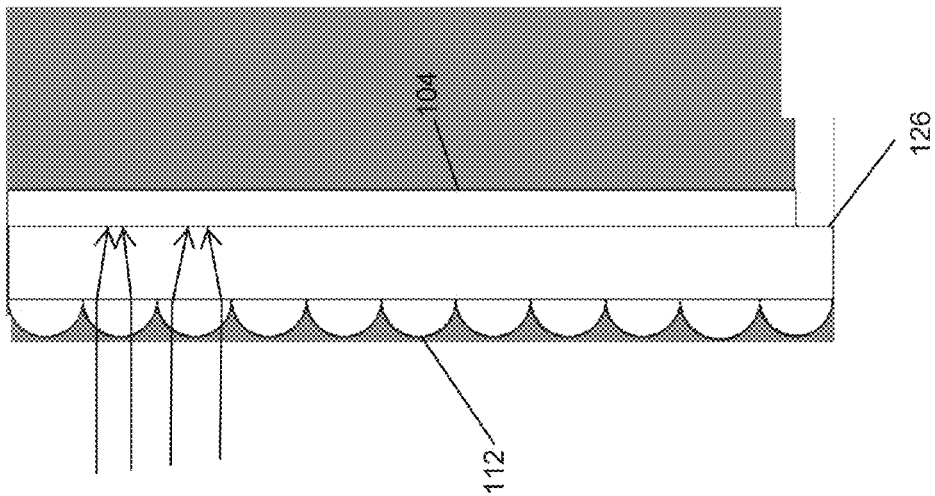
FIG. 1I illustrates light incident on the interface undergoing a focusing effect when electrical excitation ceases to be applied to the interface.
Figure 1H:
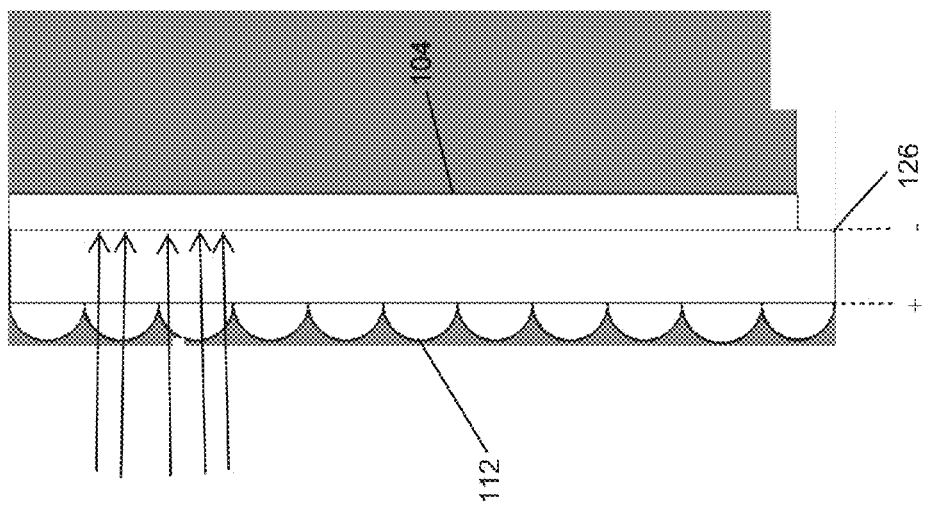
FIG. 1H illustrates the interface undergoing electrical excitation.
Figure 1G:
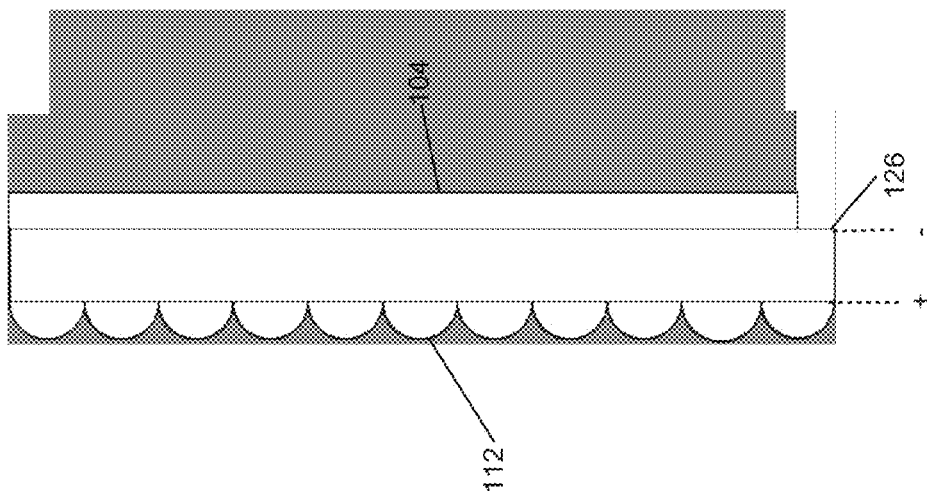
FIG. 1G illustrates an interface disposed between a micro lens assembly and an image sensor, according to one embodiment of the present invention.
Figure 2:
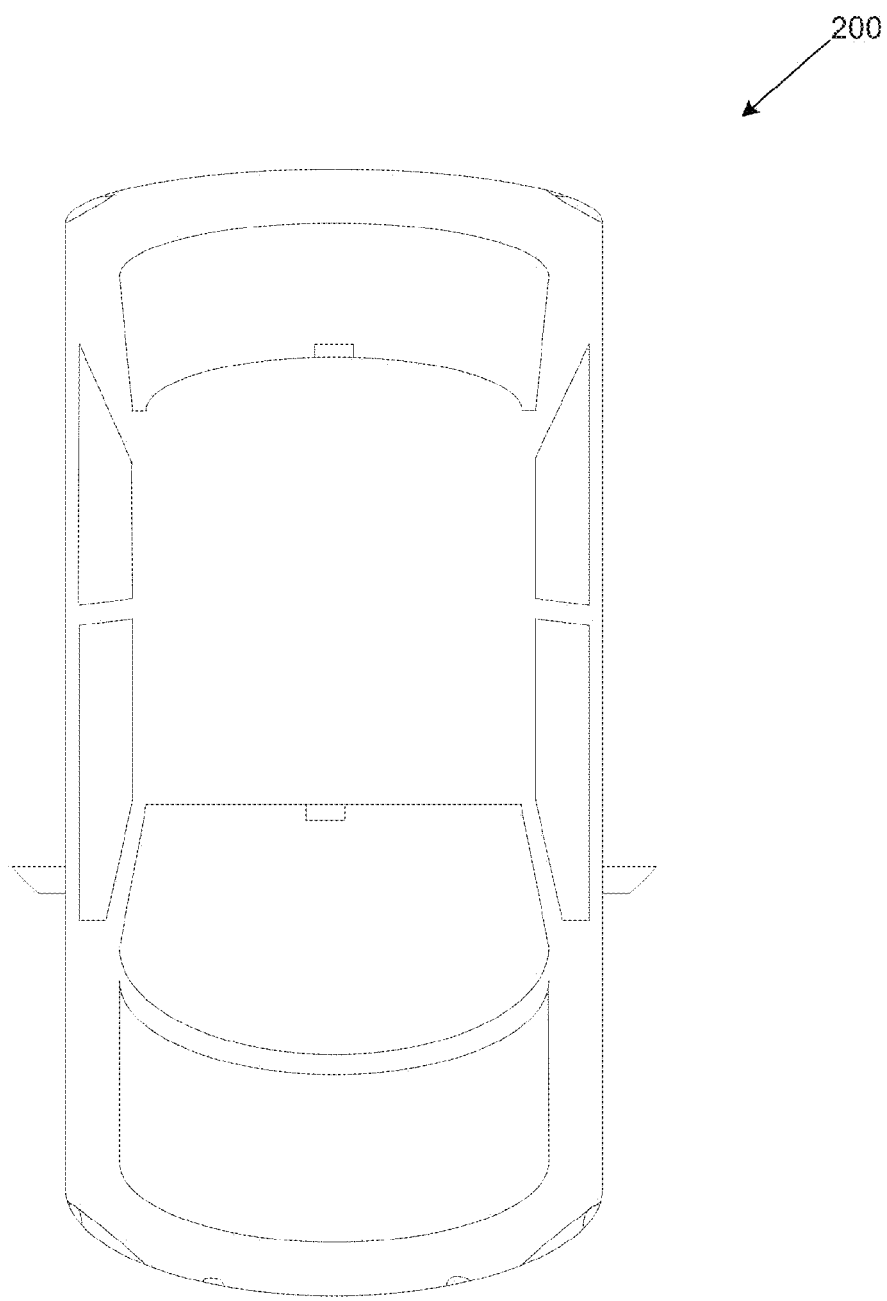
FIG. 2 is an environmental view of an imager system or display system, in accordance with embodiments of the present invention.
Figures 3A, 3B, 3C, 3D:
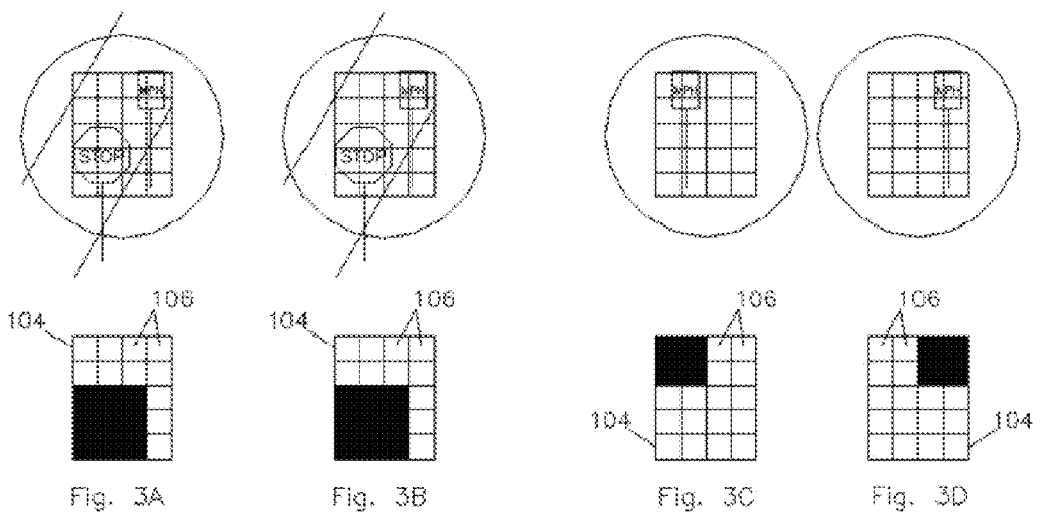
FIGS. 3A-D are schematic diagrams of a scene being imaged by an imager, in accordance with embodiments of the present invention.

By way of explanation and not limitation, in regards to FIGS. 1A-2, the imager system 100 can be used in a vehicle 200, such that the imager system 100 is configured to capture a multi-focus image having depth data, wherein the depth data can be used to control one or more vehicle functions. Thus, the imager system 100 can be mounted anywhere on the vehicle 200, such as, but not limited to, viewing a scene approximately forward of the vehicle 200, viewing a scene approximately rearward of the vehicle 200, viewing a scene approximately side-wards of the vehicle 200, a scene exterior to the vehicle 200, a scene interior of the vehicle 200, the like, or a combination thereof, so that depth data of objects in the imaged scene can be obtained independent of a second imager. Examples of vehicle control systems are, but not limited to, a headlamp control system, a forward collision warning system, a lane keeping assist system, an object detection system, a pedestrian detection system, a traffic sign recognition system, a display system, an occupant detection system, an intruder detection system, the like, or a combination thereof.

According to one embodiment, the main lens assembly 110 and the micro lens assembly 112 can have a hexagonal layout (FIG. 1C), which can enhance spatial frequency of lenses. Thus, the hexagonal layout can be used with lower resolution imagers and/or enhance color data that is obtained as compared to a standard Bayer pattern. Additionally or alternatively, the main lens assembly 110 and micro lens assembly 112 can have a circular layout, a rectangular layout, an elliptical layout, an octagonal layout, other suitable geometric shape layout, or a combination thereof. Some choices for the main lens assembly 110 can lead to some non-uniformity in the distortion and illumination onto the micro lens assembly 112. For example, if the main lens assembly 110 is a simple convex lens, a pincushion or barrel distortion can result, where the image has consistent magnification in the center and increasing magnification when moving away from the center. Similarly, illumination onto the micro lens assembly 112 can also be non-uniform, where illumination is brighter in the center and becomes dimmer when moving away from the center. One way to counteract these issues involves selecting micro lens focal lengths so that artifacts or distortions are less apparent. As a result, a more uniform/normalized rendering of a scene can be achieved.

According to one embodiment, the image sensor 104 and the micro lens assembly 112 can have an interface 126 therebetween, as shown in FIG. 1D. The interface 126 can be an index of refraction changing material configured to alternate between a first refractive index and a second refractive index. With respect to the illustrated embodiment, the first refractive index can correspond to that of the micro lenses of micro lens assembly 112 and the second refractive index can correspond to that of air. However, it should be appreciated that the second refractive index can also correspond to a value between that of the micro lens assembly 112 and air. Alternation between the first refractive index and the second refractive index can be controlled via laser excitation. As shown in FIG. 1D, a laser system 128 (e.g. a confocal laser) can project a diffraction pattern onto the interface 126 to cause the interface 126 to behave as a Fresnel lens. At that instance, the index of refraction is at a greater index state, characterized by the refractive index of the micro lenses of micro lens assembly 112. As a result, light incident upon the interface 126 is distributed across the image sensor 104, as shown in FIG. 1E. The laser system 128 can then be deactivated, causing the diffraction pattern to relax based on an image retention time of the interface 126. This allows the interface 126 to return to a lower index state, which in this case, is characterized by the index of refraction of air. As a result light incident upon the interface 126 can undergo a focusing effect, as shown in FIG. 1F. For example, a typical image readout (e.g. 60 hertz) can be generated using an interface 126 constructed from a photo-refractive material with an image retention time of less than 20 milliseconds. The photorefractive material can be provided as a coating and the image retention time can be retarded through the use of additives, if desired.

Alternatively, the interface 126 can be alternated between the greater and lower index states via electrical excitation. For example, the interface 126 can be an electrically refractive polymer, as shown in FIG. 1G. In that embodiment, an electrical switching signal can be switched ON and OFF at a frequency that corresponds to a desired frame rate. As a result, successive frames alternate between a frame having a regular image when power is applied (FIG. 1H) and a frame having a multi-focus image when power is not applied (FIG. 1I). For example, the switching signal can be switched at a frequency of 60 hertz to produce 30 hertz of a regular image and 30 hertz of multi-focus image, interweaved.

With respect to FIGS. 1 and 3A-3D, the imager system 100 can be configured so a predetermined number of pixels correspond to a minimum size of an object to be detected, according to one embodiment. For example, an object that is imaged on at least four pixels can be further evaluated through one or more image processing techniques. The predetermined number of pixels can be related to the resolution of the imager 102. Additionally or alternatively, the micro lens assembly 112 can be configured so areas of the image sensor 104 have a different pixel pitch and/or different resolution. Furthermore, larger pixels can be used for enhanced low light performance. Such an embodiment can be utilized in a vehicle control system that detects objects. With respect to any of the embodiments described herein, the imager system 100 can employ pixel-by-pixel based exposure while running at a standard frame rate.

Figure 4A:
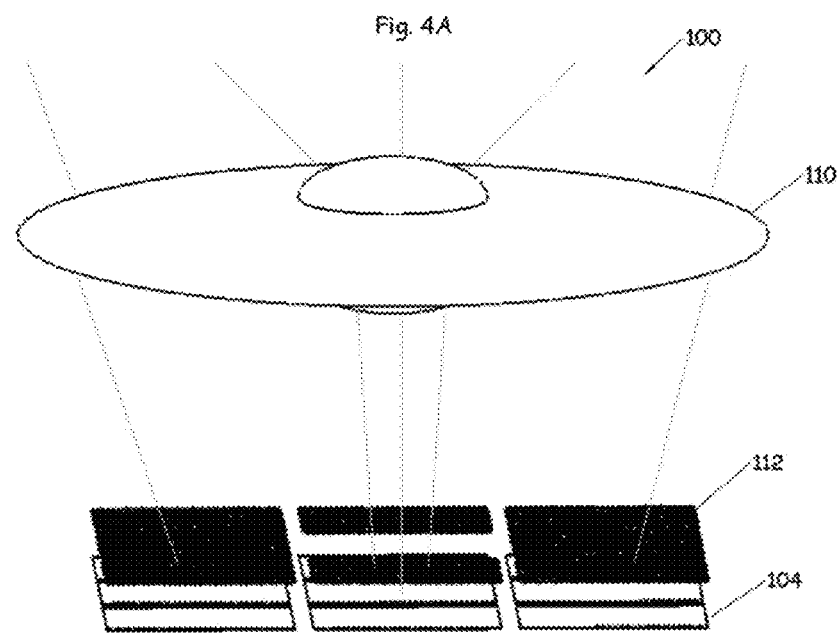
FIG. 4A is a schematic diagram of an imager system, in accordance with one embodiment of the present invention.

In regards to an embodiment illustrated in FIGS. 4A and 4B, the imager 102 can be configured so that a portion of the pixels 106 correspond to only the main lens assembly 110 and another portion of the pixels 106 correspond to the micro lens assembly 112. In such an embodiment, the imager system 100 can be configured to output an image as if the micro lens assembly 112 was not used, while also including the depth data that is captured based upon the pixels receiving light that is propagated through the micro lens assembly 112. Additionally or alternatively, the main lens assembly 110 can have a different focal length in a center portion than other portions.

With respect to FIGS. 5A-8D, the optical assembly 108 can include an electro-optic aperture assembly 118. It should be appreciated by those skilled in the art that the electro-optic aperture assembly 118 can be a separate component or integrated with the main lens assembly 110 or micro lens assembly 112. The electro-optic aperture assembly 118 can be configured to form circular, elliptical, or other suitable shaped apertures. The electro-optic aperture assembly 118 can be configured to shape the aperture with respect to the micro lenses of the micro lens assembly 112. For purposes of explanation and not limitation, the electro-optic aperture assembly 118 can change shapes in one micro lens increments (FIG. 7). The electro-optic aperture assembly 118 can be, but is not limited to, electrochromic (FIGS. 5A-5D), liquid crystal (FIG. 8A-8D), or the like. It should be appreciated by those skilled in the art that various states illustrated in FIGS. 5B-5D and FIGS. 8B-8D are applicable for both an embodiment wherein a electro-optic aperture assembly 118 corresponds to the main lens assembly 110 and an embodiment wherein a plurality of electro-optic aperture assemblies 118 correspond to the main lens assembly 110 and/or the micro lens assembly 112.

Figure 9A:
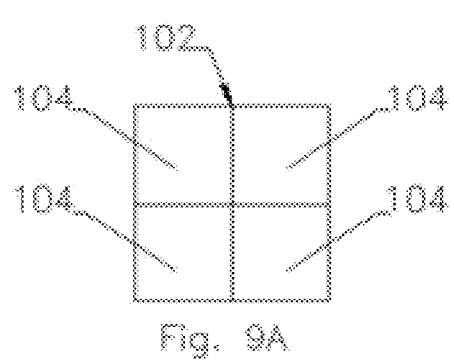
FIG. 9A is a schematic diagram of an imager having a plurality of image sensors, in accordance with one embodiment of the present invention.
Figure 9B:
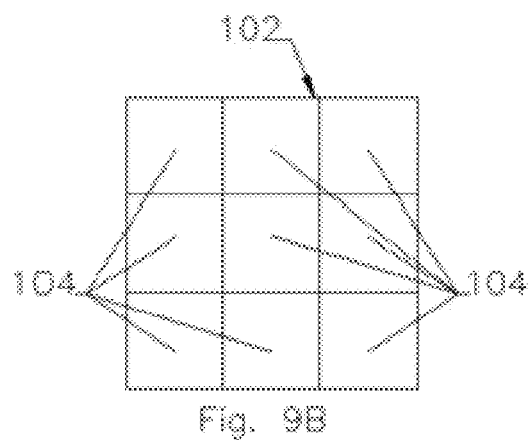
FIG. 9B is a schematic diagram of an imager having a plurality of image sensors, in accordance with one embodiment of the present invention.

As to FIGS. 9A and 9B, the imager system 100 can include a plurality of image sensors 104 as one imager 102 or separate imagers 102, according to one embodiment. At least one of the plurality of image sensors 104 can be a different resolution than others of the plurality of image sensors 104. The plurality of image sensors 104 can be planar or non-planar (e.g. curved). In either embodiment, where the plurality of image sensors 104 are the same or different resolutions, at least a portion of the plurality of image sensors 104 can be combined to form (or be processed) as a single image. In such an embodiment, affects of bad pixels is reduced, the image is more scalable, and/or high speed extraction, parallel processing with image pyramiding is enhanced. The presence of any gaps between the image sensors 104 can be minimized by using image sensors 104 in which components (e.g. wiring) are allocated on the backside. Such image sensors 104 can include back illuminated sensors, also referred to as back thinned sensors.

Figure 10A:
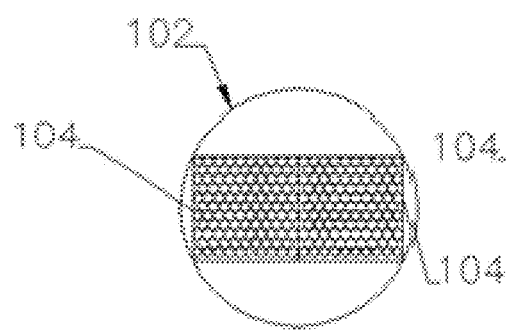
FIG. 10A is a schematic diagram of an imager system having a plurality of imagers, in accordance with one embodiment of the present invention.
Figure 10B:
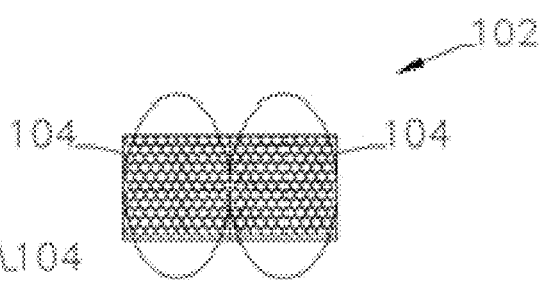
FIG. 10B is a schematic diagram of an imager system having a plurality of imagers, in accordance with one embodiment of the present invention.
Figure 10C:
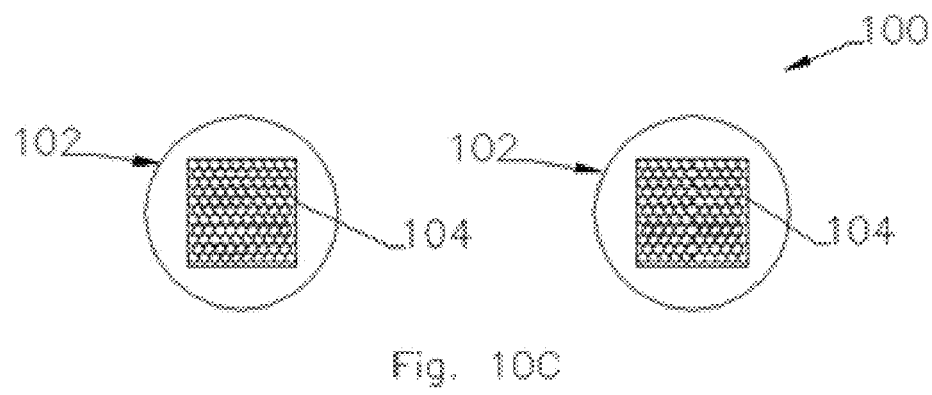
FIG. 10C is a schematic diagram of an imager system having a plurality of imagers, in accordance with one embodiment of the present invention.

According to one embodiment, with respect to FIGS. 10A-10C, the imager system 100 can include a plurality of imagers 102 and can be used in the vehicle 200 as a stereo system. A stereo system can enhance effectiveness, and the imager system 100 can have redundancy and increased sensitivity with respect to depth data, as the depth data can be obtained from a single imager 102 or a plurality of imagers 102. For greater redundancy still, the plurality of imagers 102 can be combined with distance measuring technologies (e.g. LIDAR, SONAR, IR time-of-flight sensor, etc.). Distance measurements from such distance measuring technologies can assist the imager system 100 with determining distances for various portions of a scene, thereby easing processing requirements and simplifying image extraction. Once distances are known, a lookup table can be used that allows the imager system 100 to easily combine multiple perspectives from the plurality of imagers 102.

Figure 10D:
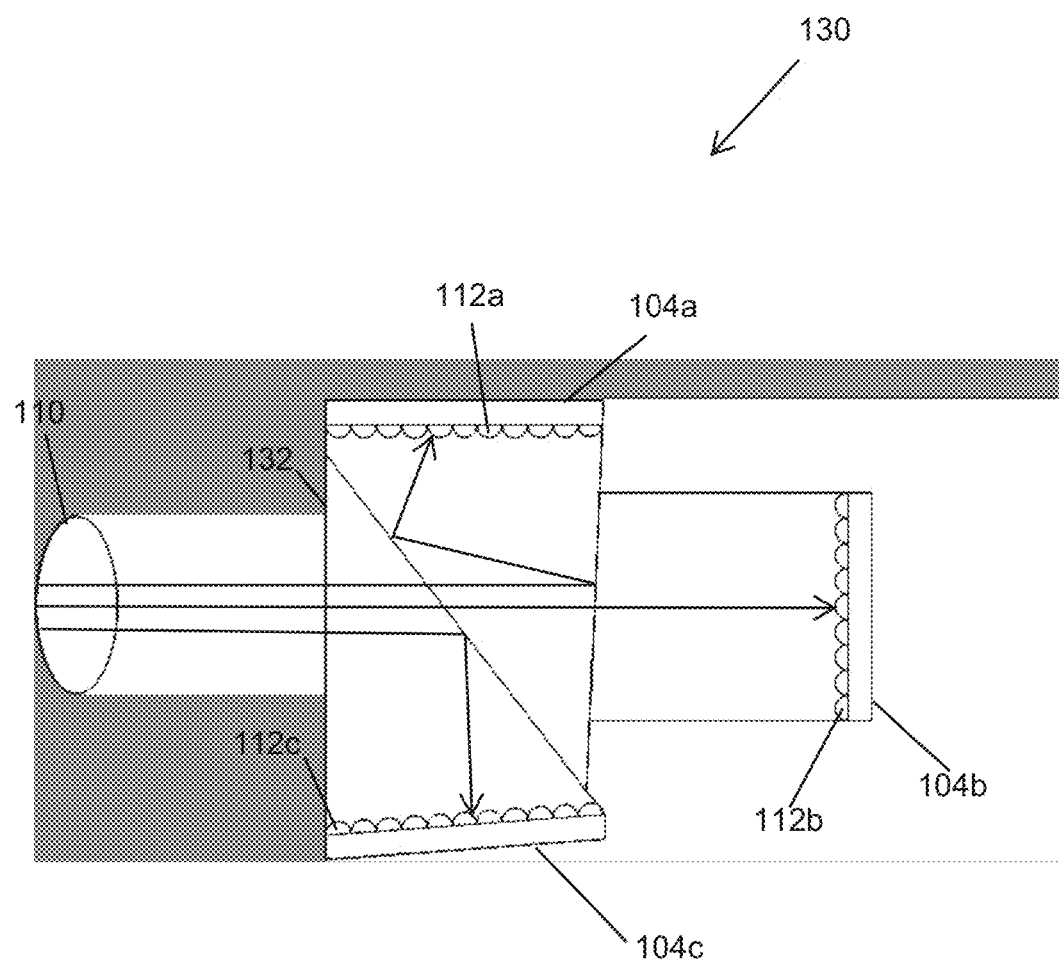
FIG. 10D is a schematic diagram of an imager having a plurality of image sensors, in accordance with one embodiment of the present invention.
Figure 10E:
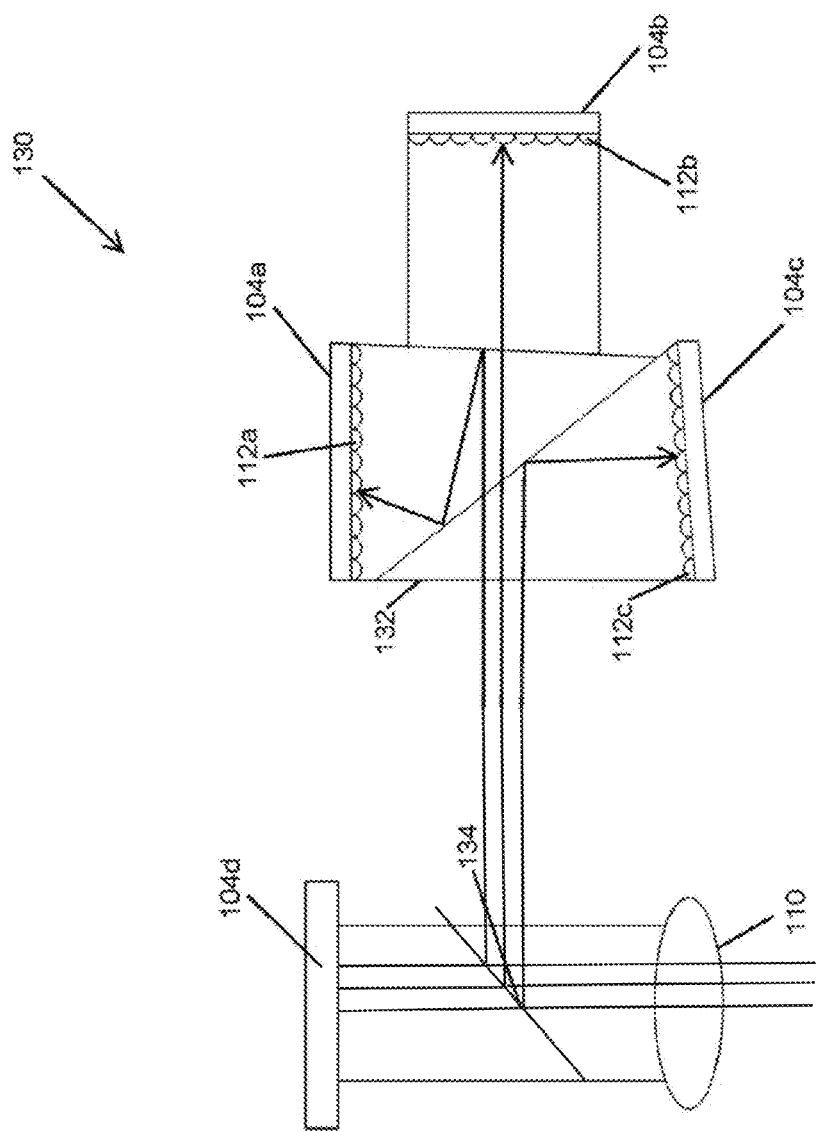
FIG. 10E is a schematic diagram of an imager having a plurality of image sensors, in accordance with one embodiment of the present invention.

The plurality of imagers 102 can be in optical communication with main lens assembly 110, the plurality of imagers 102 can be in optical communication with separate main lens assemblies 110, or a combination thereof. Additionally or alternatively, at least a portion of the plurality of imagers 102 can have different color filters (e.g., red filter, blue filter, green filter, etc.), wherein the optics assembly 108 can be configured for a respective color. For example, as shown in FIG. 10D, the imager 102 can include a prism camera 130 having image sensors 104a-c in optical communication with a main lens assembly 110. Beam splitter 132 directly receives light rays captured from the main lens assembly 110 and splits it towards each image sensor 104a-c. Image sensors 104a-c can be back illuminated CCD or CMOS sensors, also known as back thinned sensors, which can provide for better low light performance. Beam splitter 132 can be a trichroic prism for splitting light rays into a red component received by image sensor 104a, a green component received by image sensor 104b, and a blue component received by image sensor 104c. While image sensors 102a-c are shown with corresponding micro lens assemblies 112a-c, it should be appreciated that each image sensor 102a-c may or may not be provided with a corresponding micro lens assembly 112a-c. Furthermore, each micro lens assembly 112a-c, if provided, can be identical or different with respect to one another. Although three image sensors 102a-c have been shown, it should be appreciated that other numerical combinations are possible. It should also be appreciated that prism camera 130 can be integrated with other optical/imaging components. For example, as shown in FIG. 10E, the imager 102 can include prism camera 130 and an additional image sensor 104d. In that embodiment, an additional beam splitter 134 is provided and directly receives light rays captured from the main lens assembly 110 and splits the light rays towards image sensor 104d and beam splitter 132 of prism camera 130. In turn, beam splitter 132 splits the light rays into red, green, and blue components that are received in image sensors 104a, 104b, and 104c, respectively, as described previously. With the inclusion of beam splitter 134, the imager 102 can be packaged so that the imager does not outwardly appear as a stereo system. That is, each image sensor 104a-104d can share a single main lens assembly 110 by virtue of beam splitter 134 properly allocating light rays received from the main lens assembly 110 to each of the image sensors 104a-104d. With respect to the illustrated embodiment, image sensor 104d can be a back thinned CCD or CMOS sensor to provide better low light performance. Additionally, image sensor 104 may or may not be provided with a corresponding micro lens assembly. If provided, the micro lens assembly can be similar or different with respect to any available micro lens assemblies of 112a-c of image sensors 104a-c.

While the imager 102 has been described above to include a CCD/CMOS prism camera 130, the imager 102 can include other types of camera systems. According to one embodiment, the imager 102 can include a line-scan camera or a time delayed integration (TDI) camera, both of which can be used with vehicle motion to form images. The maximum integration time and sensor read rate could be determined by the speed of the vehicle. According to another embodiment, the imager 102 can include an infrared camera such as, but not limited to, near infrared cameras (NIR), short wave infrared (SWIR) cameras, mid-wave infrared (MWIR) cameras, and long wave infrared (LWIR) cameras. The use of infrared cameras can be advantageous for imaging through clouds and fog as well as measuring temperatures, which may benefit vehicle control systems employing fog detection. Presently, infrared camera systems can have resolution restrictions, which may require multi-sensing arrays in order to scale to higher resolutions. According to yet another embodiment, the imager 102 can include an ultraviolet-field camera or a terahertz-field camera. It should be appreciated that the imager system 100 can include a combination of any of the types of cameras described herein.

Additional examples of an imager are disclosed in U.S. Pat. No. 8,289,430, entitled "HIGH DYNAMIC RANGE IMAGING DEVICE," U.S. Pat. No. 8,305,471, entitled "HIGH DYNAMIC RANGE IMAGING DEVICE," U.S. Pat. No. 8,378,284, entitled "IMAGING DEVICE," U.S. Pat. No. 8,144,223, entitled "IMAGING DEVICE," U.S. Patent Application Pub. No. 2009/0256938, entitled "IMAGING DEVICE," now U.S. Pat. No. 8,629,927, and U.S. Patent Application Pub. No. 2009/0190015, entitled "IMAGING DEVICE," now U.S. Pat. No. 8,587,706, all of which are hereby incorporated herein by reference in their entirety.

As previously mentioned, the imager system 100 can be used in a vehicle 200 to capture a multi-focus image having depth data, which can be used to control one or more vehicle functions. With respect to vehicle implementation, emphasis can be placed on frame to frame analysis such that decisions are not made based on a single image. For example, differences between consecutive images can be used to translate locations of stationary objects in relation to a moving vehicle 200. Thus, by using frame to frame analysis, probability or statistical based decision making can be implemented prior to effectuating a vehicle function, which can help to negate the effects of errors (e.g. wrong measurements) encountered while imaging a scene.

The imager system 100 can include a plurality of imagers 102 having lensing (e.g. elliptical lenses) or multiple cameras to increase field of view. Additionally or alternatively, the plurality of imagers 102 can be configured to perform object detection at certain distance ranges, such as, but not limited to, near, mid, and far distance ranges. To do so, specialized optic assemblies 108 or one or more cameras can be dedicated for each distance range. For example, at least a portion of the plurality of imagers 102 can be configured for near distance object detection, which can assist a collision warning system in avoiding slow speed collisions. In that embodiment, the images can be processed to isolate only the objects located in the near distance range. The images can then be presented to a viewer (e.g. via a display) in a manner that focuses the viewer's attention onto the objects. For example, objects located in the near distance range can be displayed in full color whereas objects in the mid and far distance ranges can be darkened. It should be appreciated that similar image processing can be done for the mid and/or far distance ranges to assist a collision warning system in avoiding higher speed collisions. Further, when it is detected that a collision with an object is probable, the imager system 100 can be configured to zoom in on the associated area and provide a distance to object measurement, which can be used by the collision warning system or other systems in assessing whether to perform a vehicle function in response thereto.

In any of the embodiments described herein, the imager system 100 can be scaled to reduce cost. For example, image sensors 104 having the same resolution can be incorporated into multiples to increase resolution and/or expand distances of interest. In addition, image processing can be scaled such that each image sensor 104 can be processed independently (e.g. each sensor 104 has its own processing unit) and the information combined before making a decision. Furthermore, the imager system 100 can be optimized for whatever vehicle application it is used for. For example, the imager system 100 can be configured to alter its field of view based on the speed at which a vehicle 200 is travelling. According to one embodiment, the field of view becomes narrower with increasing vehicle speed. Additionally or alternatively, at least the imager 102 of the imager system 100 can be steered based on directional changes of the vehicle 200, which can enable the imager system 100 to detect objects of interest sooner. The steering of at least the imager 102 can be performed using liquid lenses or piezoelectric movements. The same can also be used to change parameters of at least the imager 102 such as, but not limited to, a focus and/or an effective focal length of the imager 102. In another example, the imager system 100 can be configured to pan and tilt based on the steering angle of a vehicle 200. According to one embodiment, the image can be panned and tilted to provide a faux 3D image. In this instance, the imager 102, which can include a camera, can be stationary and a viewer can rely on parallax/perspective in the multi-focus image when making distance determinations. More specifically, since multiple perspectives can be obtained from the multi-focus image, it is possible to sweep a single image frame from the farthest left viewpoint to the farthest right viewpoint so as to create a left to right panning effect. In such an instance, a viewer's eyes are typically unable to discern a shift for objects that are relatively close while panning occurs. Conversely, a shift in objects that are relatively far is more easily discernable. In this manner, a viewer can discern a distance relationship.

With respect to a front vehicle facing configuration, the imager system 100 can be configured to focus on objects beyond the vehicle windshield. For example, the optics assembly 108 of the imager system 100 can be configured to have a focus range of 1 foot to infinity, which makes the imager system 100 quite effective beginning a few feet in front of the windshield. In this manner, objects on the windshield, such as water droplets or other debris can be ignored.

The imager system 100 or components thereof can be mounted inside the vehicle 200 using a kinematic mount, which can include a ball and slot design and enables the imager to be precisely oriented in a variety of positions. Additionally, or alternatively, liquid lens or piezoelectric based movement can be utilized to impart movement to the imager system 100 or components thereof. While electric or servo motors can also be used, they may not be sufficiently robust for long term vehicle use. Regardless of how movement is imparted to the imager system 100, it may be desirable to provide fail safes that return the imager system 100 to a default electronic and/or mechanical setting if power to the imager system 100 is lost. For example, if using a kinematic mount, a tensioned return mechanism, such as a spring, can be provided that returns the imager system 100 to a default mechanical position in the event that power loss of the camera motion system occurs.

According to one embodiment, the imager system 100 can be mounted inside a vehicle 200 and used to monitor a driver and/or other occupant. At least a portion of the imager system 100 can be hidden from occupant view behind a mirror glass having a transflective layer or similar coating. The imager system 100 can be configured to perform a variety of tasks such as, but not limited to, detecting erratic behavior, blink detection, ergonomic optimization, mirror or display alignment, and focusing. Additionally or alternatively, the imager system 100 can be used for airbag optimization. For example, the depth data can be used to calculate the mass and/or height of an occupant. Additionally or alternatively still, the imager system 100 can be used to improve current facial recognition techniques. For example, facial recognition typically establishes a distance relationship between key facial features, such as eyes, nose, and ears. By using the imager system 100 described herein, facial recognition could benefit from using depth data to establish a depth relationship of certain facial features such as, but not limited to, a nose length or eye socket depth. The availability of depth information would improve facial recognition accuracy, which could lead to increased optimization of a vehicle for each particular user. This could be especially useful in distributed car networks that have large user databases, such as Zipcar®.

With respect to FIGS. 11-13B, a display system is generally shown at reference identifier 300. The display system 300 can be configured for use in the vehicle 200 in addition or alternatively to the imager system 100. The display system 300 can include similar optics as the imager system 100 and may include a light engine assembly 350 instead of an image sensor as in the imager system 100.

The display system 300 can include at least one display assembly generally indicated at reference identifier 352 that can be configured to display a multi-focus image having depth data. The display assembly 352 can include the light engine assembly 350 for generating an image on the display 354, which can include an array of pixels 356. The display assembly 352 can also include the optics assembly 108 of the imager system 100, which includes. The main lens assembly 110 and the micro lens assembly 112. The micro lens assembly 112 can be disposed relative to the display 354 to focus to infinity. Additionally or alternatively, the micro lens assembly 112 can be configured to capture light rays from the image shown on the display 354 and project the light rays on to the main lens assembly 110. The main lens assembly 110 can be configured to project the light rays received from the micro lens assembly 112 on to a plane 113 located distal to the display 354. The display system 300 can also include a controller 356 in communication with the display assembly 352, wherein the controller is configured to receive an input from an imager and output a signal for displaying an image on the display assembly 352, the displayed image having depth data, as described in greater detail herein.

Figure 12A:
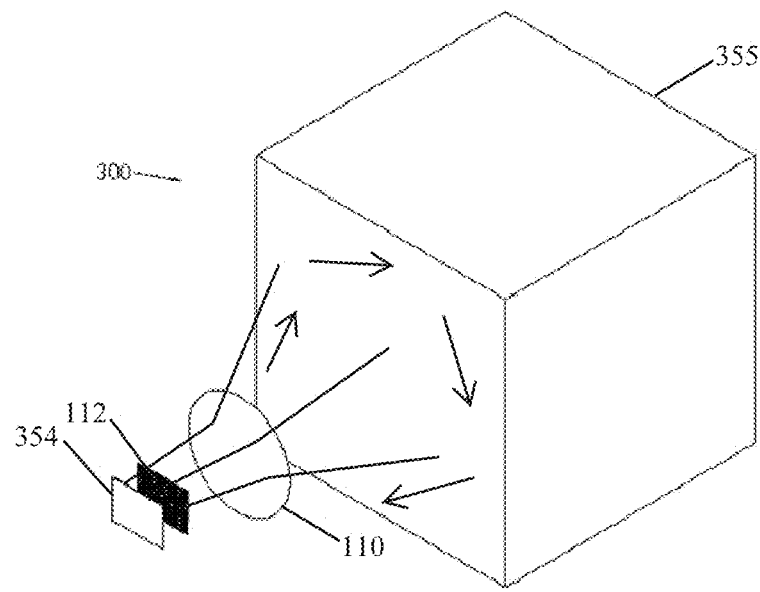
FIG. 12A is a schematic diagram of a display system, in accordance with one embodiment of the present invention.
Figure 12B:
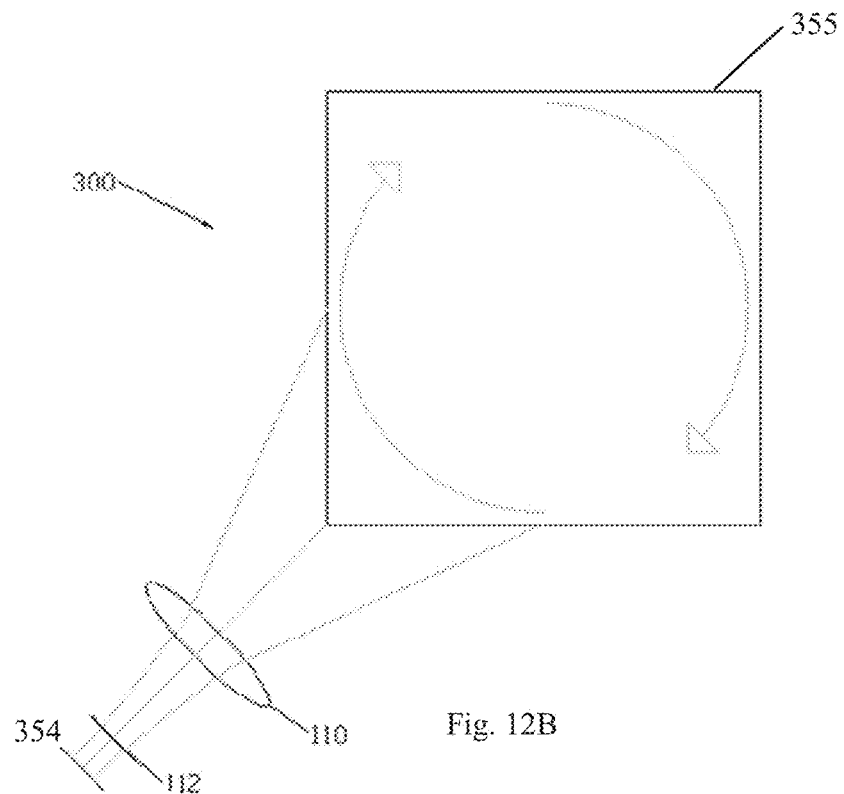
FIG. 12B is a schematic diagram of a display system, in accordance with one embodiment of the present invention.
Figure 13B:
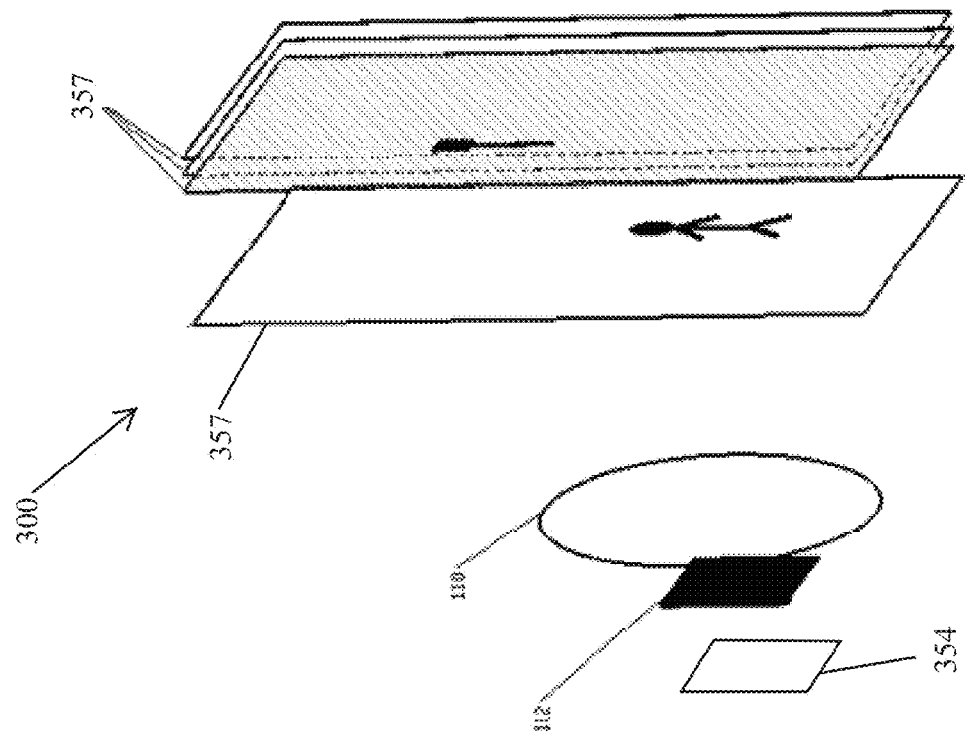
FIG. 13B is a schematic diagram of a display system, in accordance with one embodiment of the present invention.
Figure 13A:
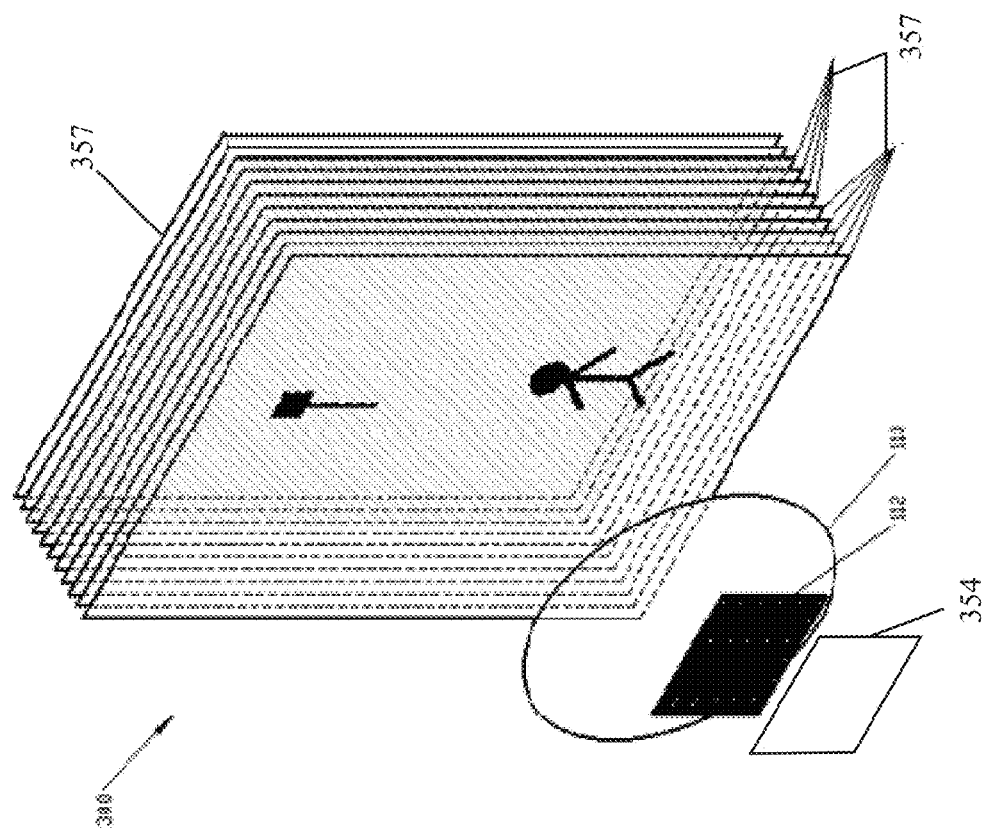
FIG. 13A is a schematic diagram of a display system, in accordance with one embodiment of the present invention.

According to one embodiment, the display system 300 can be a three-dimensional (3D) display system. In such an embodiment, the display system 300 can be in communication with the imager system 100. Such that multi-focus images captured by the imager system 100 are shown on the display 354. According to an embodiment shown in FIG. 12A, the display system 300 can further include an object 355 positioned to receive light rays projected from the main lens assembly 110. Additionally, as shown in FIG. 12B, the object 355 may be rotated and approximately synchronized with the light engine 350 (or projector). According to an alternative embodiment, shown in FIGS. 13A and 13B, the display system 300 can further include a plurality of panes 357 positioned to receive light rays projected from the main lens assembly 110. The plurality of panes 357 can be liquid crystal (e.g., 3D liquid crystal (LCD)) and configured to block the projected light rays at certain depths, or the like, so as to provide a real three dimensional scene. The display system 300 can be configured as a heads up display (HUD) and utilize a short throw laser digital light processing (DLP) projector to decrease the projection distance between the projector and the chosen projection screen. If in communication with a prism camera (e.g. prism camera 130), the display system 300 can include a multi-LCD projector having at least one LCD for each separate color component.

The display system 300 can be used in a vehicle 200, such as, but not limited to, replacing one or more mirrors. For example, the display system 300 can be used to replace a rearview mirror. In such a configuration, the image can be projected onto the rearview mirror to increase distance of an observer to an object, and can be used to obtain long distance focus back to the observer. Additionally or alternatively, the image can be manipulated in a number of manners, such as slightly out of focus or two images positionally shifted left and right on a glasses-less 3D display, so that a close range display appears to each individual eye of a viewer as being in far field. Thus, the display system 300 would appear focused at infinity so that a viewer's eyes don't need to be refocused to process a two-dimensional image in order to make distance interpretations. It should be appreciated by those skilled in the art that there are numerous methods to deceive human vision such that a 3D image appears at a greater distance than it truly is. Given the above, it should be appreciated that a side view mirror can be similarly replaced, with the exception that the imager system 100 can be at least partially incorporated inside the side view mirror and the display system 300 is provided inside the vehicle 200. In the instance where an imager system 100 includes one or more cameras, some consideration should be given to the dynamic range of the cameras and maintaining a relatively clear view. To aid in this task, various cleaning systems can be used to ensure that the camera view is unobstructed. Such cleaning systems can include, but are not limited to, eyelid systems, piezoelectric sprayers systems, heated glass lens systems, etc. Additionally or alternatively, the imager system 100 can include back illuminated sensors, as described previously, to increase performance in low light conditions.

Figure 14A:
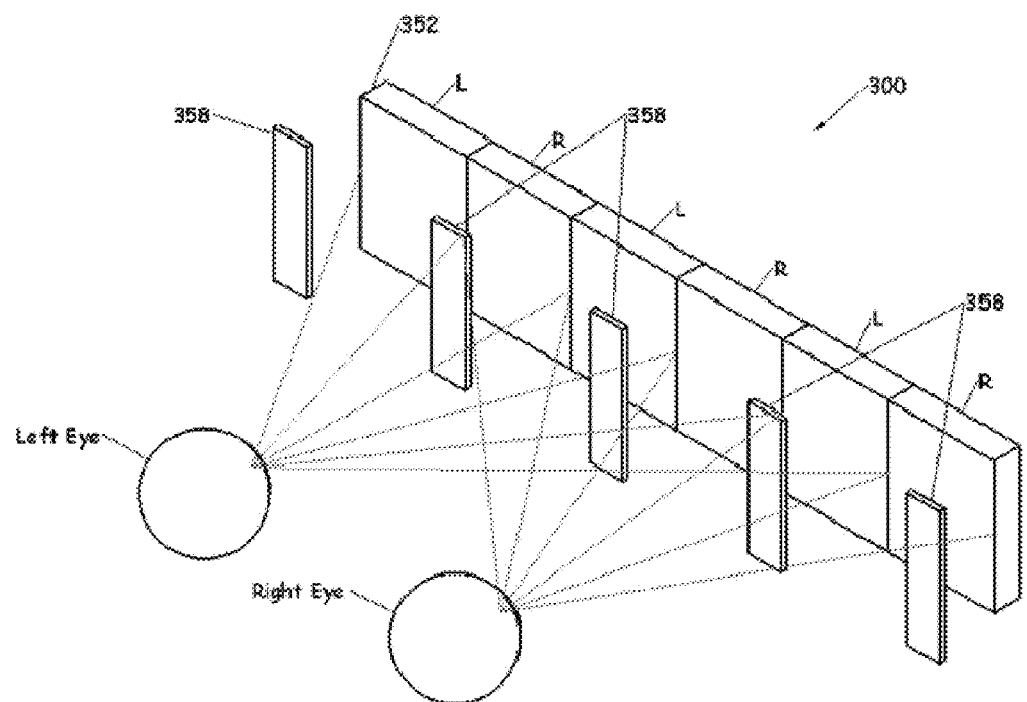
FIG. 14A is a schematic diagram of a display system, in accordance with one embodiment of the present invention.
Figure 14B:
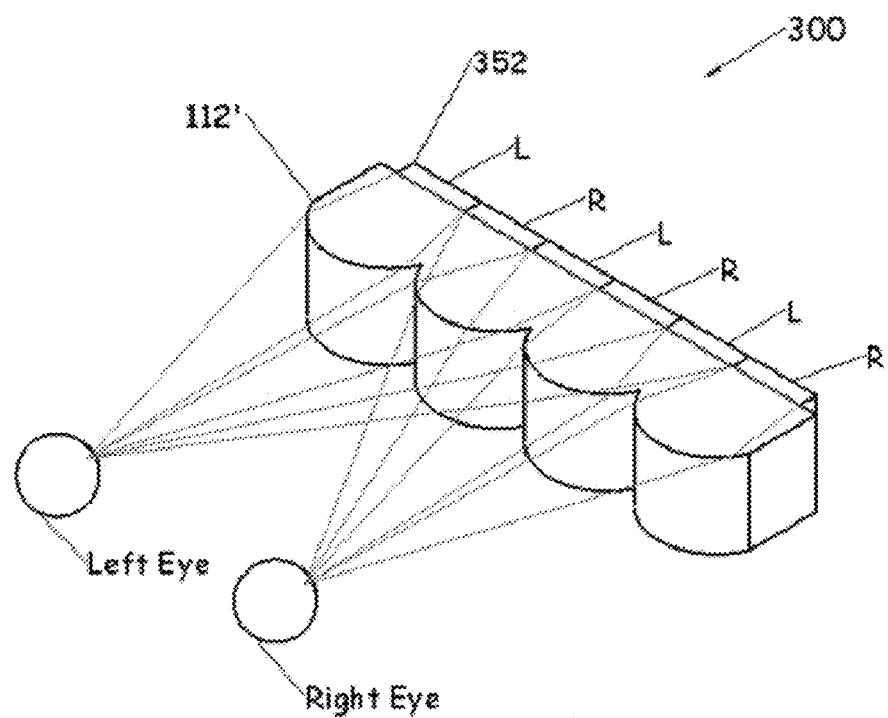
FIG. 14B is a schematic diagram of a display system, in accordance with one embodiment of the present invention.

According to one embodiment, as exemplary illustrated in FIGS. 14A and 14B, the display system 300 can be configured as a glasses-less 3D display. The display system 300 may include the display assembly 352 described herein or any other suitable display assembly. The display system 300 may also include a display device in optical communication with the display assembly 352 and configured to convey depth perception to a viewer viewing an image on the display (e.g. display 354) of the display assembly. A controller (e.g. controller 114) may be in communication with the display assembly 352 and configured to receive an input from an imager (e.g. imager 102) and output a signal for displaying the image on the display assembly 352. An embodiment of the display device, as illustrated in FIG. 14A, can be a parallax glasses-less 3D display, and an embodiment, as illustrated in FIG. 14B, can be a lenticular glasses-less 3D display. In such an embodiment, the display system 300 can be configured to operate based upon a viewer's characteristics. Thus, a camera monitoring the viewer can be used, so that a controller (e.g. controller 114) can be configured to control the image displayed on the display 354 based upon the position, height, size, etc. of the viewer. This can result in a different displayed image for each eye of the viewer and providing the appearance of depth. As exemplary illustrated in FIG. 14A, the display system 300 can include at least one parallax barrier 358. For example, in an embodiment with at least one parallax barrier 358, each row of pixels can display a different image, and the parallax barrier 358 can be configured to move to alter which image is viewed by the viewer. A parallax assembly can be configured to adjust dynamically, based upon data stored in memory, the like, or a combination thereof. Also, as exemplary illustrated in FIG. 14B, the display system 300 can include the micro lens assembly, such as a lenticular lens array 112'. For example, in an embodiment with at least one lenticular lens array 112', each row of pixels can display a different image, and the lenticular lens array 112' can be configured to move to alter which image is viewed by the viewer. A lenticular lens array 112' can be configured to adjust dynamically. The dynamic adjust can be based upon, but is not limited to, data stored in memory.

In any of the embodiments described herein, the systems 100, 300 can be powered using an onboard vehicle power source or an independent power source and can be configured to reduce power consumption. By way of explanation and not limitation, the systems 100, 300 can include a field programmable gate array (FPGA), a digital signal processor (DSP), parallel RISC/CISC architectures, the like, or a combination thereof, and can also can use an architecture setup to follow ISO 17356 (open interface for embedded automotive applications) guidelines. Additionally or alternatively, the systems 100, 300 can be configured to communicate (e.g., output 116 and/or input 120) with a vehicle bus (e.g., CAN, LIN, GMLAN, etc.). For example, the imaging system 100 can convey the need for defrosting or wiper motion via the vehicle bus in instances where its field of view is obstructed. In response, the associated vehicle systems can decide on the appropriate course of action (e.g. activate the defroster or wipers, provide an occupant warning, etc.).

The output 116 can be a control signal that is received by another vehicle component, such that the other vehicle component is controlled based upon the control signal. According to an alternate embodiment, the output 116 can be a signal that is received by another vehicle component wherein the vehicle component is controlled based upon the received output 116 (e.g., data, recommendation, etc.). Additionally or alternatively, the output can be a standard video signal for presentation on the display system 300 or an alternative vehicle display. Subsequently, the video output could provide real time feedback such as, but not limited to, highlighting objects with a colored overlay depicting object distance.

Figure 11A:
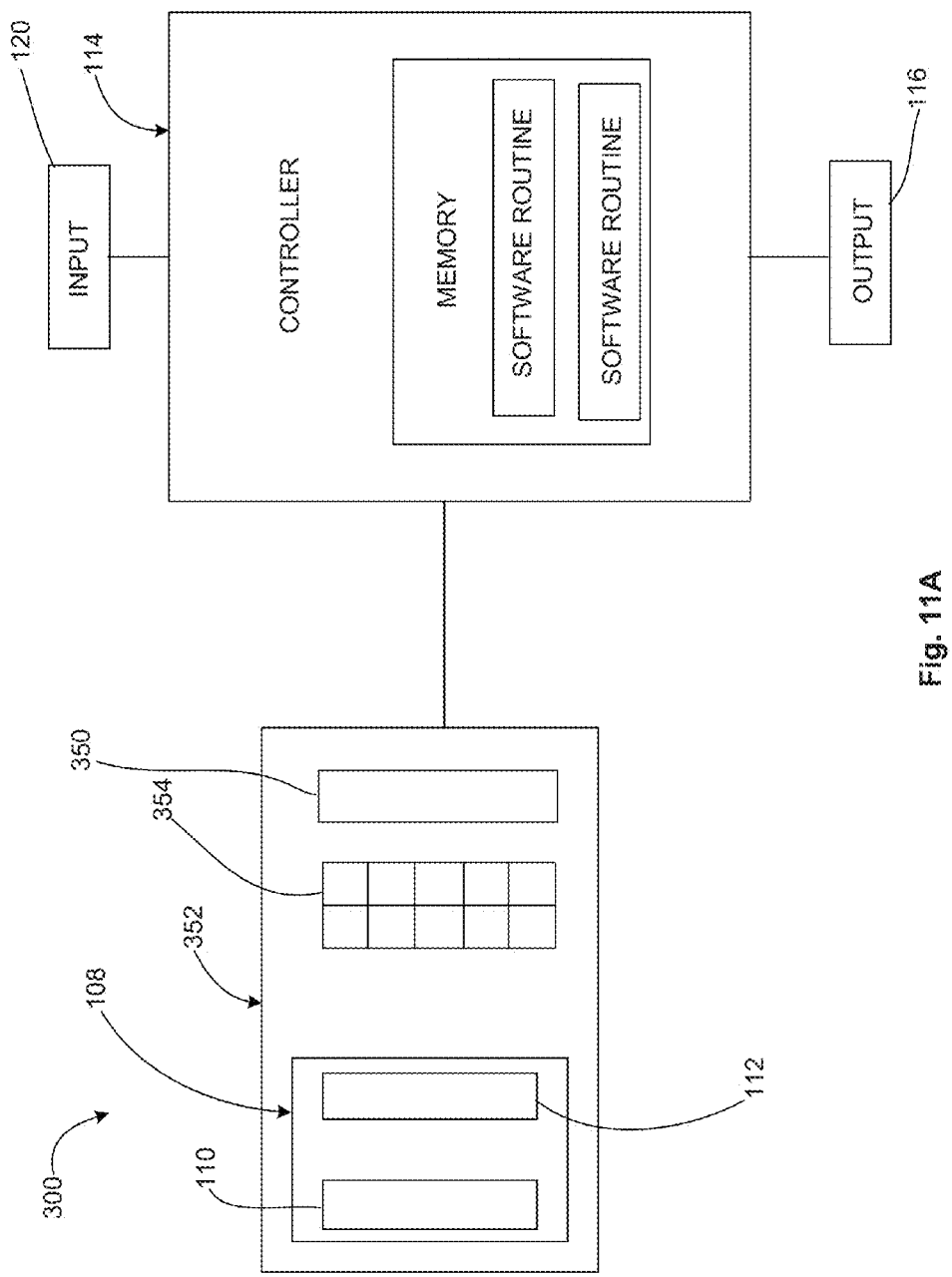
FIG. 11A is a block diagram of a display system, in accordance with one embodiment of the present invention.
Figure 11B:
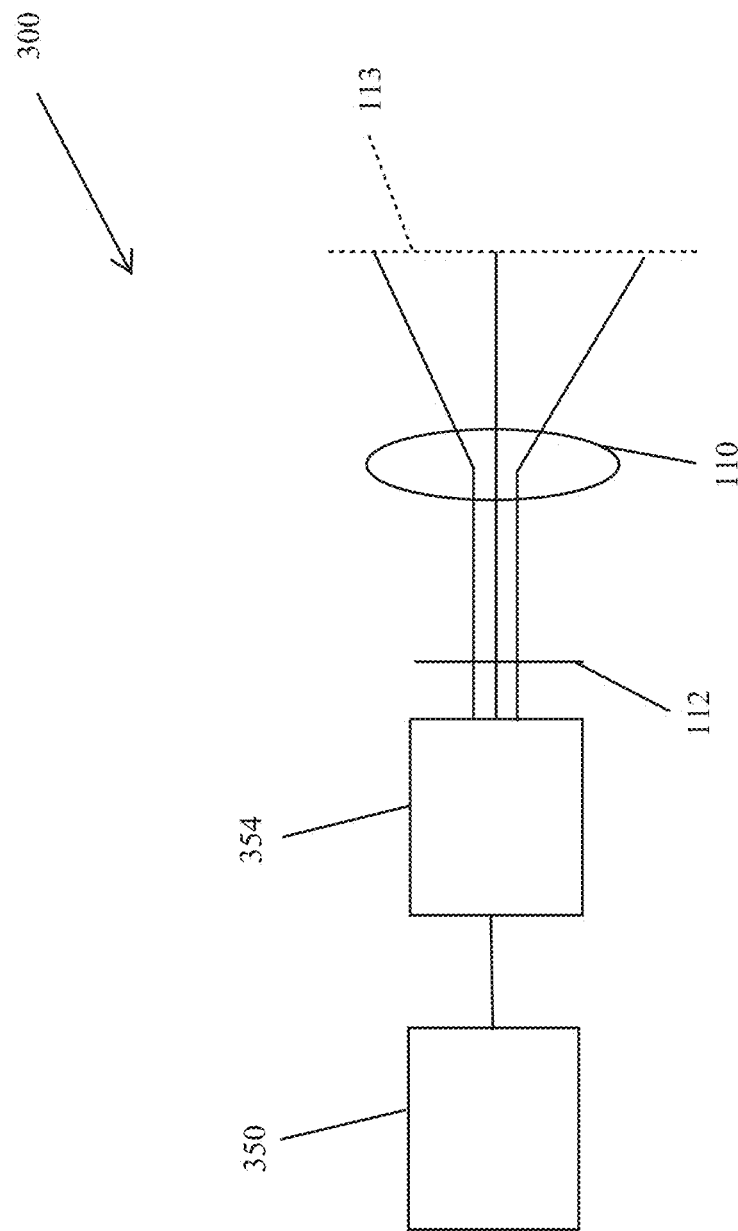
FIG. 11B is a schematic diagram of a display system, in accordance with one embodiment of the present invention.

With respect to FIGS. 1A and 11A, the controller 114 can include or be in communication with a memory device 122 configured to store one or more executable software routines 124. Thus, the controller 114 can be configured to execute the one or more executable software routines to process an image and/or display an image, as described herein.

It will be appreciated that embodiments of the invention described herein may be comprised of one or more conventional processors and unique stored program instructions that control one or more processors to implement, in conjunction with certain non-processor circuits, some, most, or all of the functions of a multi-focus optical system, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

For purposes of the present disclosure, and as will be explained in greater detail herein below, the electrochromic medium preferably comprises at least one solvent, at least one anodic material, and at least one cathodic material.

Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Examples of electro-optic materials are disclosed in U.S. Pat. No. 8,228,590, entitled "ELECTRO-OPTIC SYSTEM CONFIGURED TO REDUCE A PERCEIVED COLOR CHANGE," and U.S. patent application Ser. No. 13/865,592, filed on Apr. 18, 2013, entitled "ELECTRO-OPTIC SYSTEM CONFIGURED TO REDUCE A PERCEIVED COLOR CHANGE," now U.S. Pat. No. 8,964,278, all of which are hereby incorporated herein by reference in their entirety.

Other examples of an electrochromic medium can be chosen from one of the following categories:

(I) Single-layer, single-phase—The electrochromic medium may comprise a single-layer of material which may include small non-homogenous regions, and include solution-phase devices where a material may be contained in solution in an ionically conducting electrolyte which remains in solution in the electrolyte when electrochemically oxidized or reduced. Solution-phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Patent Publication No. 2002/0015214 A1 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer, such as linking of a color-stabilizing moiety, to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices,"

which is hereby incorporated herein by reference in its entirety including all references incorporated and/or cited therein.

(II) Multi-layer—The electrochromic medium may also be prepared in layers and include a material attached directly to an electrically conducting electrode or confined in close proximity thereto which remains attached or confined when electrochemically oxidized or reduced.

(III) Multi-phase—The electrochromic medium may further be prepared using multiple phases where one or more materials in the medium undergoes a change in phase during the operation of the device, for example a material contained in solution in the ionically conducting electrolyte forms a layer on the electrically conducting electrode when electrochemically oxidized or reduced.

According to one embodiment, an imager system configured for a vehicle control system, the imager system comprising at least one imager configured to capture a multi-focus image having depth data, the imager comprising an image sensor comprising an array of pixels and an optics assembly in optical communication with the image sensor, the optics assembly configured to capture light rays, wherein the optics assembly comprising a main lens assembly configured to substantially focus a scene on to a plane a micro lens assembly in optical communication between the main lens and the image sensor to substantially focus on to the same plane as the main lens assembly extending out to infinity, and a controller in communication with the imager, wherein the controller is configured to output a signal for controlling a function of the vehicle, the signal based upon the depth data determined from the multi-focus image.

The imager system as described herein, wherein the function of the vehicle that is controlled based upon the signal is at least one of headlamp control, forward collision warning, lane keeping assist, object detection, pedestrian detection, traffic sign recognition, displaying an image, occupant detection, and intruder detection.

The imager system as described herein, wherein the function of the vehicle that is controlled based upon the signal is object detection for collision avoidance, and an imaged object is ignored if the imaged object is imaged by less than about four pixels of the array of pixels.

The imager system as described herein, wherein a diameter of a first micro lens at an outer portion of the micro lens assembly are different than a diameter of a second micro lens at an inner portion of the micro lens assembly.

The imager system as described herein, wherein the micro lens diameters are one of circular, rectangular, hexagonal, or octagonal.

The imager system as described herein, wherein a profile of a first micro lens at an outer portion of the micro lens assembly are different than a profile of a second micro lens at an inner portion of the micro lens assembly.

The imager system as described herein, wherein the micro lens profiles are one of circular, rectangular, hexagonal, or octagonal.

The imager system as described herein, wherein the main lens assembly comprises an inner portion and an outer portion, and the inner portion has a different focal length than the outer portion.

The imager system as described herein further comprising an electro-optic lens assembly in optical communication with the main lens assembly, wherein the electro-optic lens assembly is configured to alter transmittance states to define an aperture with respect to the main lens assembly, the micro lens assembly, and the imager.

The imager system as described herein, wherein the electro-optic lens assembly is one of an electrochromic aperture assembly and a liquid crystal aperture assembly.

The imager system as described herein further comprising an electro-optic lens assembly in optical communication with the micro lens assembly, wherein the electro-optic lens assembly is configured to alter transmittance states to define an aperture with respect to the micro lens assembly and the imager.

The imager system as described herein, wherein the electro-optic lens assembly is one of an electrochromic aperture assembly and a liquid crystal aperture assembly.

The imager system as described herein, wherein the at least one imager comprises a plurality of imagers in optical communication with the main lens assembly.

The imager system as described herein, wherein micro lenses of the micro lens assembly is configured to enhance effectiveness of imaging on the pixel array.

The imager system as described herein, wherein the micro lenses of the micro lens assembly are substantially hexagonally shaped.

The imager system as described herein, wherein pixels of the array of pixels are configured to enhance effectiveness of imaging of the micro lens assembly.

The imager system as described herein, wherein the main lens assembly and the micro lens assembly have at least one different diameter, profile, and focal length.

The imager system as described herein, wherein the controller comprises at least one of a field programmable gate array (FPGA), digital signal processor (DSP), and a parallel RISC/CISC.

The imager system as described herein, wherein the main lens assembly and the micro lens assembly are configured to enhance spatial recognition in one of a vertical axis and horizontal axis.

The imager system as described herein, wherein the main lens assembly and the micro lens assembly are elliptical.

The imager system as described herein, wherein the at least one imager comprises at least two of a first imager comprising a main lens assembly and a micro lens assembly configured for imaging a near-field scene, a second imager comprising a main lens assembly and a micro lens assembly configured for imaging a mid-field scene, and a third imager comprising a main lens assembly and a micro lens assembly configured for imaging a far-field scene.

A display system configured for an occupant display system, the display system comprising at least one display assembly configured to display a multi-focus image having depth data, the display assembly comprising a display comprising an array of pixels, and an optics assembly in optical communication with the display, the optics assembly configured to display light rays, wherein the optics assembly comprising a main lens assembly configured to substantially project a scene on to at least one plane extending out to infinity, a micro lens assembly in optical communication between the main lens and the display to substantially project on to at least one plane and extending out to infinity, and a controller in communication with the display assembly, wherein the controller is configured to receive an input from an imager and output a signal for displaying an image on the display assembly, the image having depth data.

The display system as described herein, wherein a diameter of a first micro lens at an outer portion of the micro lens assembly are different than a diameter of a second micro lens at an inner portion of the micro lens assembly.

The display system as described herein, wherein the micro lens diameters are one of circular, rectangular, hexagonal, or octagonal.

The display system as described herein, wherein a profile of a first micro lens at an outer portion of the micro lens assembly are different than a profile of a second micro lens at an inner portion of the micro lens assembly.

The display system as described herein, wherein the micro lens profiles are one of circular, rectangular, hexagonal, or octagonal.

The display system as described herein, wherein the main lens assembly comprises an inner portion and an outer portion, and the inner portion has a different focal length than the outer portion.

The display system as described herein, wherein micro lenses of the micro lens assembly are substantially hexagonally shaped.

The display system as described herein, wherein pixels of the array of pixels are substantially hexagonally shaped.

The display system as described herein, wherein the controller comprises at least one of a field programmable gate array (FPGA), digital signal processor (DSP), and a parallel RISC/CISC.

The display system as described herein, wherein the main lens assembly and the micro lens assembly are elliptical.

The display system as described herein configured as a glasses-free 3-dimensional display.

The display system as described herein, wherein micro lenses of the micro lens assembly are aligned with pixels of the display assembly.

It should be appreciated by those skilled in the art that the image system 100 and display system 300 may have advantages not explicitly described herein. It should further be appreciated by those skilled in the art that the components of the image system 100 and display system 300 may be combined in ways not explicitly stated herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An imager system for a vehicle, comprising:
    at least one imager configured to capture a multi-focus image having depth data, the imager comprising:
        at least one image sensor comprising an array of pixels; and
        an optics assembly comprising:
            a main lens assembly configured to capture light rays from a scene of a vehicle environment and substantially focus the light rays on to a plane; and
            at least one micro lens assembly in optical communication with the main lens assembly and the at least one image sensor, wherein at least a portion of the light rays outputted from the main lens assembly pass through the at least one micro lens assembly and is received by the at least one image sensor;
    a controller in communication with the at least one imager, wherein the controller is configured to output a signal to a vehicle control system based upon the depth data of the multi-focus image;
    an interface disposed between the at least one image sensor and the at least one micro lens assembly, the interface comprising an index of refraction changing material configured to alternate between a first refractive index and a second refractive index.

2. The imager system of claim 1, wherein the first refractive index is a refractive index of the at least one micro lens assembly and the second refractive index is a refractive index of air.

3. The imager system of claim 1, wherein the first refractive index is a refractive index of the at least one micro lens assembly and the second refractive index has a value between the first refractive index and a refractive index of air.

4. The imager system of claim 1, further comprising an excitation source for alternating the interface between the first refractive index and the second refractive index.

5. The imager system of claim 4, wherein the excitation source comprises a laser system configured to project a diffraction pattern onto the interface, and wherein the interface exhibits the first refractive index when the laser system is activated and exhibits the second refractive index when the laser system is deactivated, thereby causing light incident upon the interface to undergo a focusing effect.

6. The imager system of claim 4, wherein the excitation source comprises an electrical switching signal.

7. The imager system of claim 1, comprising a plurality of imagers, each configured for object detection at one of a near distance range, a mid distance range, and a far distance range.

8. The imager system of claim 1, wherein the at least one micro lens assembly comprises a plurality of micro lenses, each disposed relative to the image sensor to focus out to infinity.

9. The imager system of claim 1, further comprising at least one beam splitter configured to split the light rays outputted from the main lens assembly and a plurality of micro lens assemblies, each configured to receive light rays from the at least one beam splitter and to output the light rays towards an associated image sensor.

10. The imager system of claim 9, wherein the at least one beam splitter is configured to split light rays into a red, a green, and a blue component, wherein the red component is received by a first image sensor, the green component is received by a second image sensor, and the blue component is received by a third image sensor.

11. The imager system of claim 9, wherein the at least one beam splitter comprises a first beam splitter and a second beam splitter, the first beam splitter configured to split light rays captured by the main lens assembly towards a first image sensor and the second beam splitter, the second beam splitter configured to split light rays received from the first beam splitter towards the plurality of micro lens assemblies.

12. The imager system of claim 9, wherein the plurality of image sensors are each one of a back thinned CCD sensor and a CMOS sensor.

* * * * *

UNITED STATES PATENT AND TRADEMARK OFFICE
CERTIFICATE OF CORRECTION

PATENT NO. : 9,707,892 B2  
APPLICATION NO. : 14/325956  
DATED : July 18, 2017  
INVENTOR(S) : Andrew M. Foley Page 1 of 1

It is certified that error appears in the above-identified patent and that said Letters Patent is hereby corrected as shown below:

In the Claims

Column 18, Line 4, after "image;" insert -- and --

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*